(12) United States Patent
Roethig

(10) Patent No.: US 8,414,407 B2
(45) Date of Patent: Apr. 9, 2013

(54) SWINGBUDDIES

(76) Inventor: Sherry Jean Roethig, Mesa, AZ (US)

( * ) Notice: Subject to any disclaimer, the term of this patent is extended or adjusted under 35 U.S.C. 154(b) by 208 days.

(21) Appl. No.: 12/927,088

(22) Filed: Jul. 21, 2010

(65) Prior Publication Data

US 2012/0071059 A1 Mar. 22, 2012

(51) Int. Cl.
*A63G 9/00* (2006.01)
*A63H 33/00* (2006.01)

(52) U.S. Cl.
USPC .......................................... 472/118; 446/227

(58) Field of Classification Search .......... 472/118–125; 446/71–73, 227
See application file for complete search history.

(56) References Cited

U.S. PATENT DOCUMENTS

| | | | | |
|---|---|---|---|---|
| 5,197,925 A | * | 3/1993 | Cunard | 472/118 |
| 5,197,926 A | * | 3/1993 | Cunard | 472/118 |
| 5,326,326 A | * | 7/1994 | Cunard et al. | 472/118 |
| 6,978,962 B1 | * | 12/2005 | Fore et al. | 242/474.4 |
| 7,578,746 B1 | * | 8/2009 | Johnson | 472/118 |
| 2008/0096457 A1 | * | 4/2008 | Urias | 446/26 |

* cited by examiner

*Primary Examiner* — Kien Nguyen

(57) ABSTRACT

Swingbuddies are a device with a fastening mechanism for placement around swing chains. The preferred embodiments of the invention consist of a fabric panel with padding inside, a character head attached to the top of the fabric panel with two tie ribbons attached to the character head. The fabric panel's fastening mechanism is six male and six female snaps located on the back of the panel and spaced evenly down the length of the panel. The fabric panel also consists of two character arms on the front of the panel and two character feet on the bottom of the panel. To use the preferred embodiments of the invention, a person will simply tie the two tie ribbons to a link on a swing chain; fasten the male to the female snaps to enclose the swing chain. The device is now in place for a child to sit on the swing and hold. Since the device is made to be used in pairs, a child using this device will have one swing chain cover in each hand while swinging on a swing. This device will prevent the child from getting hands, arms, and fingers pinched from the chain and also keep hair from getting tangled in the chain. The device also prevents germs at public play areas, covers hot swing chains, and most of all provides comfort and companionship to a child while swinging.

7 Claims, 3 Drawing Sheets

FIG. 1     FIG. 2
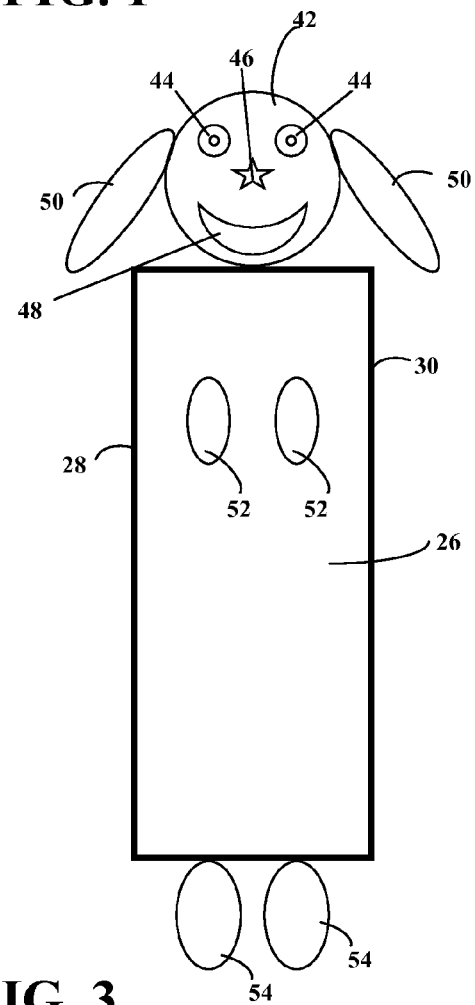
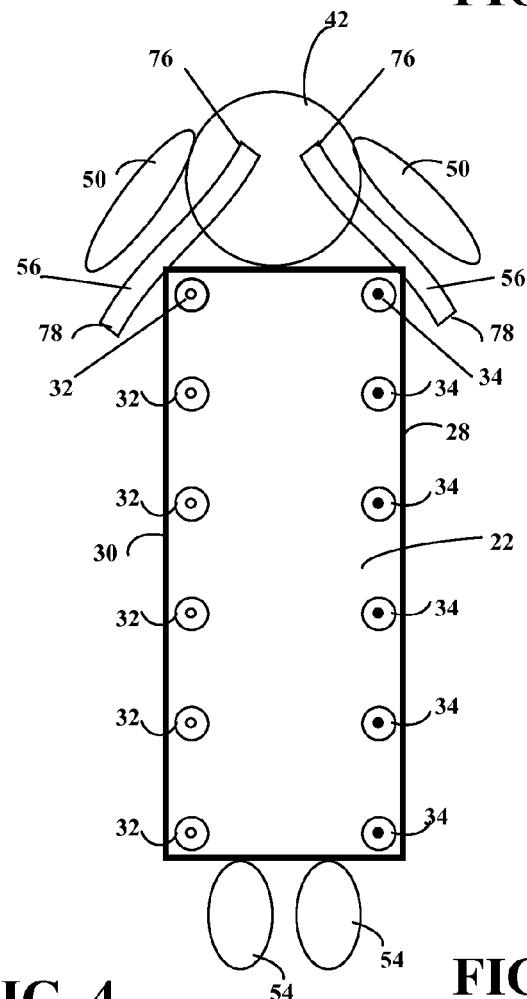
FIG. 3     FIG. 4     FIG. 5
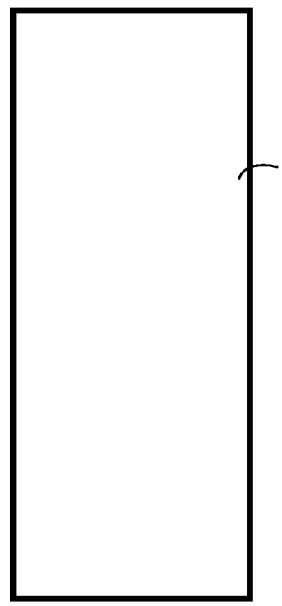
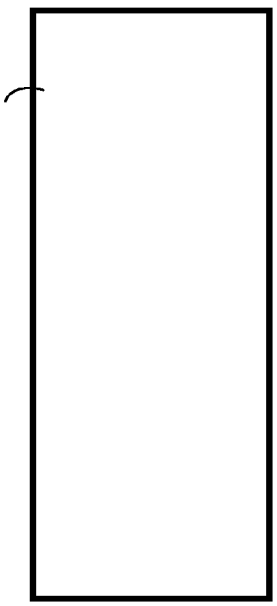
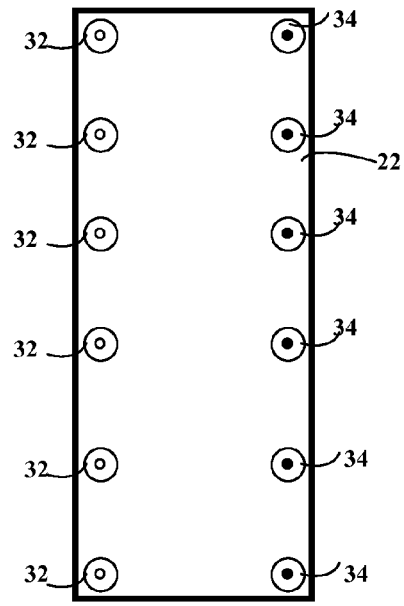

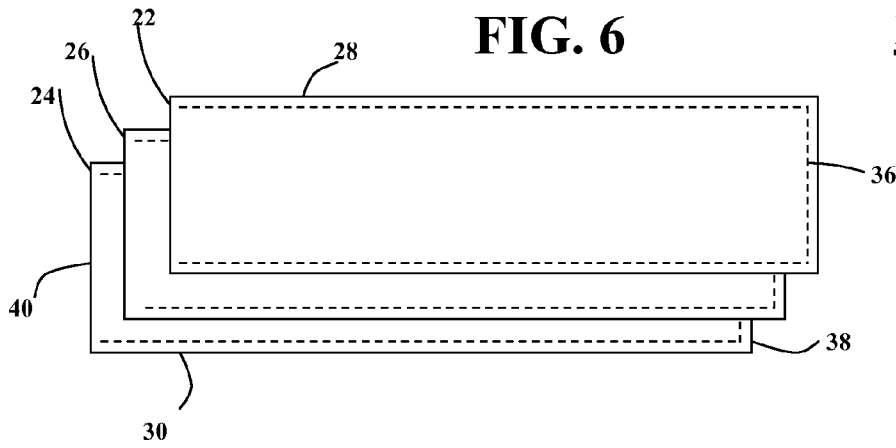
FIG. 6
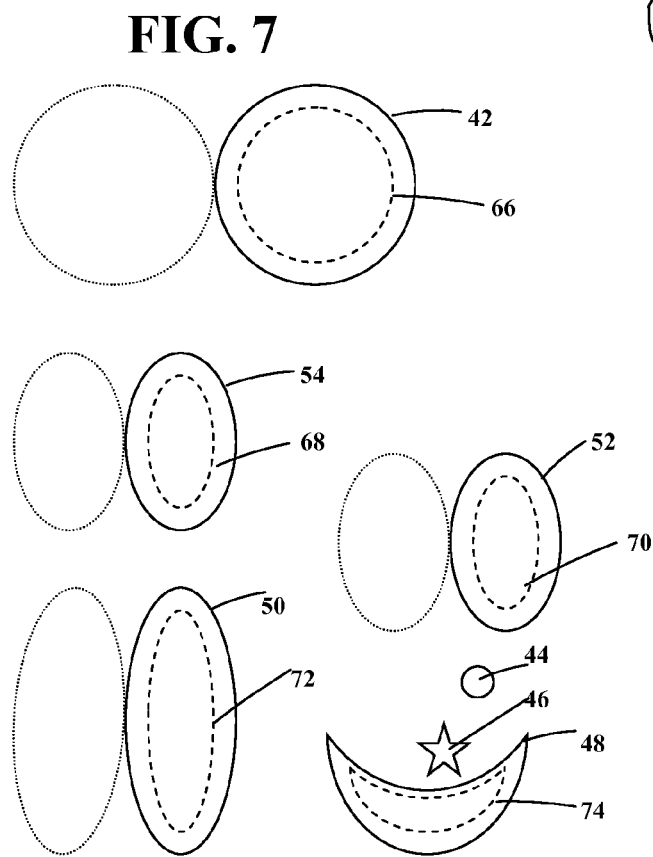
FIG. 7
FIG. 8
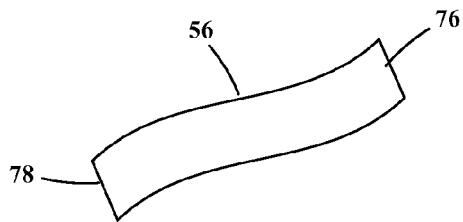
FIG. 9

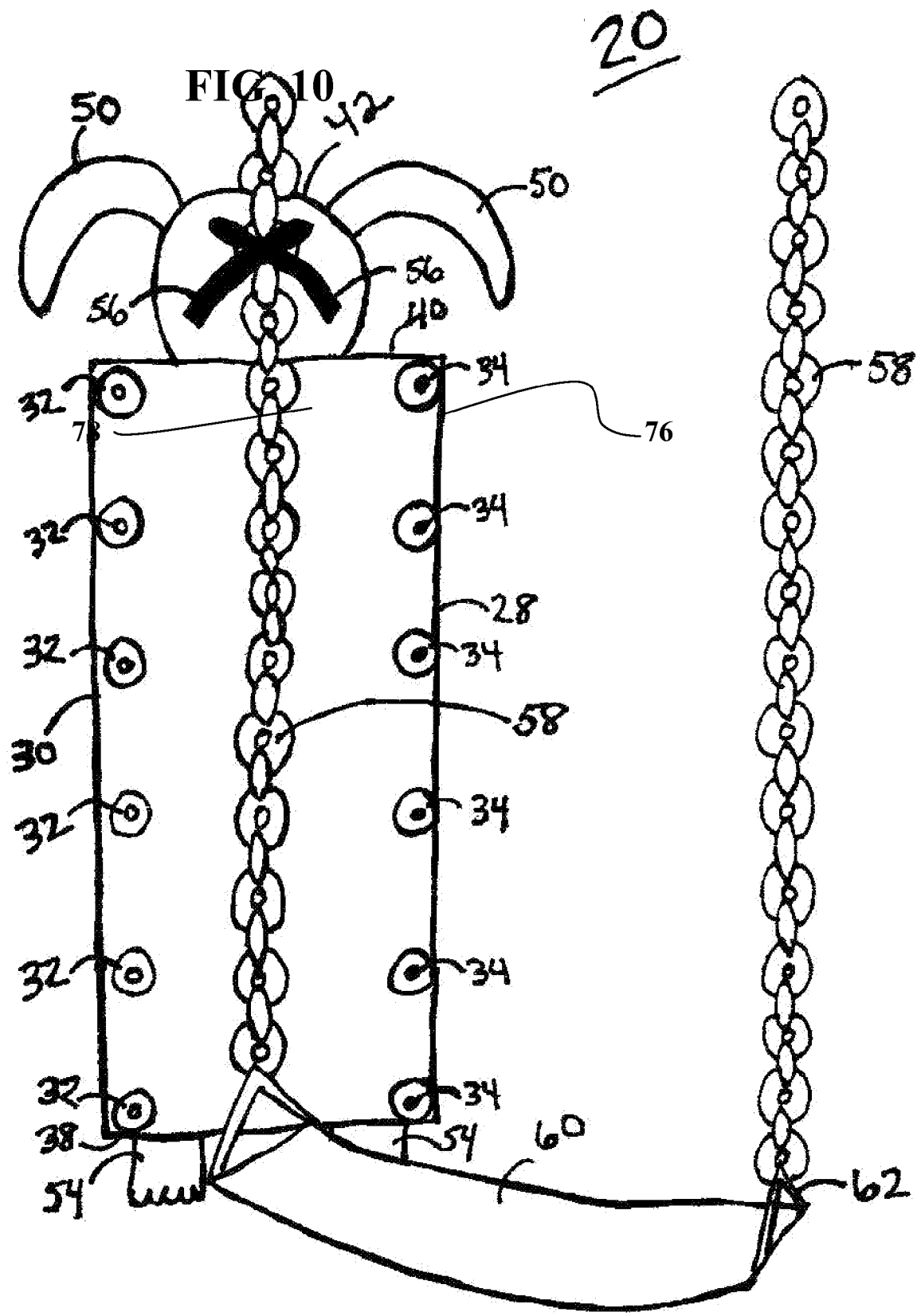

US 8,414,407 B2

SWINGBUDDIES

TECHNICAL FIELD OF INVENTION

The present invention relates to the field of recreational equipment, furthermore relating to outdoor playground equipment. More specifically relates to a removable swing chain cover for a swing chain.

BACKGROUND OF THE INVENTION

For many years children have been swinging on swings attached to various types of playground equipment. Children around the world are entertained and have great fun while swinging. Throughout the years there have been many mishaps directly connected to the chain itself which is used for the children to hold onto with both hands holding one chain per hand to pull and gain momentum for swinging action.

Children have actually had many, mostly minor injuries sustained due to swing chains. These injuries include, a child's skin being pinched by the chain usually on the inner arms. In addition, children with long hair have had their hair caught in the chain's links and were actually stuck to the chain by their hair until a parent gets them untangled.

In addition, swing chains can be hard for small hands to hold onto and grasping a swing chain can hurt the palms of a child's hands. Fingers of small children can get caught in the chain's links and hurt the child.

Also, in addition, parents can take the swing chain cover to the public playground and attach them to the swing chains so that their children do not have to hold the germ covered swing chain that all the other kids have held previously. In addition, if the swing chain is hot from being in the sun, the swing chain cover covers the hot chain for a comfortable, soft hold instead of burning their small hands.

To the best of my knowledge and searching history, this product is not available on the market nor is there anything close to this product or the concept of its use available.

The above aforementioned lead to the need for a product that is safer, more comfortable, and much more fun than using the swing chain by itself.

Accordingly, what is needed is a swing chain cover that mitigates the aforementioned problems.

SUMMARY OF THE INVENTION

Accordingly, it is an advantage of the present invention that a swing chain cover for a child's use be provided.

It is an advantage of the present invention that a swing chain cover is provided that offers safety and comfort for a child's use.

Another advantage of the present invention is that a swing chain cover offers germ free swinging for a child so that the child does not have to touch the swing chain.

Yet another advantage of the present invention is that children can not get pinched by the swing chain if it is covered with a swing chain cover.

Another advantage of the present invention is that a swing chain that has a cover can not entangle a child's long hair in the links and the cover serves as a safety feature in itself.

Yet another advantage of the present invention is that the swing chain cover covers a hot chain so that the child can hold the cover and not the hot chain, another safety feature in itself.

The above and other advantages of the present invention are carried out in one form or another by a swing chain cover that includes a top panel, a middle panel, and a back panel, which are sewn together along the first longitudinal edge, the first latitudinal edge, and the second longitudinal edge. The measurement of the panels is thirty inches long on both longitudinal edges and seven inches wide on both latitudinal edges forming the swing chain cover unit having a rectangular shape.

The above and other advantages of the present invention are carried out in one form or another by a swing chain cover that includes a stuffed animal character head with ears, eyes, nose and mouth, that is sewn onto the second latitudinal edge, two stuffed animal character feet that are sewn onto the first latitudinal edge, and two stuffed animal character arms that are sewn onto the cover unit at approximately five inches down from the second latitudinal edge, and approximately two inches in from both the first and second longitudinal edges.

The above and other advantages of the present invention are carried out in one form or another by a swing chain cover that includes six brass snaps that are sewn onto the back panel so that the cover unit can be snapped around a swing chain.

The above and other advantages of the present invention are carried out in one form or another by a swing chain cover which includes two ribbon ties that are sewn onto the back of the head panel and serve as the point of attachment for the cover unit to attach to a swing chain's links for a secure hold.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a front view of the swing chain cover in accordance with a preferred embodiment of the present invention;

FIG. 2 shows a front view of the back of the swing chain cover of FIG. 1;

FIG. 3 shows a front view of the front panel of the swing chain cover of FIG. 1;

FIG. 4 shows a front view of the middle panel of the swing chain cover of FIG. 1;

FIG. 5 shows a front view of the back panel of FIG. 2;

FIG. 6 shows a top view of the middle panel of FIG. 4, the front panel of FIG. 3, and the back panel of FIG. 5 of the swing chain cover of FIG. 1, layered according to how they are sewn together;

FIG. 7 shows a front view of the head panel, the foot panel, the arm panel, the ear panel, and the eye snaps, nose snap, and the mouth panel of the of the swing chain cover of FIG. 1;

FIG. 8 shows a perspective view of the 100% polyester stuffing used to stuff the head panel, foot panel, arm panel and ear panel of FIG. 7 of the swing chain cover of FIG. 1;

FIG. 9 shows a perspective view of the seven inch piece of ribbon having a first end and a second end of the swing chain cover of FIG. 2; and FIG. 10 shows a perspective view of the back of the swing chain cover of FIG. 1 attached and secured to a swing chain by the ribbon of FIG. 9;

DETAILED DESCRIPTION OF THE PREFERRED EMBODIMENT

Referring to FIGS. 1-5, FIG. 1 shows of front view of a swing chain cover 20 in accordance with a preferred embodiment of the present invention. FIG. 2 shows a front view of the back of the swing chain cover 20. FIG. 3 shows a front view of the front panel 26 of the swing chain cover 20. FIG. 4 shows a front view of the middle panel 24 of the swing chain cover 20. FIG. 5 shows a front view of the back panel 22 of the swing chain cover 20. The swing chain cover 20 exhibits two stuffed character arm panels 52 which are sewn onto the front panel 26 at approximately five inches down from the second latitudinal edge 40 and approximately two inches in from both the first longitudinal edge 28 and the second longitudinal edge 30 of the swing chain cover 20. Two stuffed character foot panels 54 which are sewn onto the front panel 26 along the first latitudinal edge 38 into seam 36 thus attaching them to the swing chain cover 20. The head panel 42, after all the parts, i.e. eye snaps 44, ear panels 50, and the nose snap 46, are attached, and the mouth panel 48 is sewn on, the head panel 42 is sewn onto the second latitudinal edge 40 into seam 36 (not shown, referring to FIG. 6) of swing chain cover 20.

The back panel 22 exhibits six female nickel plated brass snaps 32 which are sewn onto the back panel 22 along the second longitudinal edge 30 at approximately five inches apart. Six male nickel plated brass snaps 34 which are sewn onto the back panel 22 along the first longitudinal edge 28 at approximately five inches apart. Two pieces of one inch wide ribbon 56 having a first end 76 and a second end 78. The two pieces of ribbon are sewn onto the back of head panel 42 at the first ends 76 at approximately both sides of the centered location. The ribbons 56 are used to secure the swing chain cover 20 to a swing chain 58 (not shown, referring to FIG. 10) by tying the ribbon 56 by the ribbon's two second ends 78 in which one of the ribbons passes through a swing chain's link 58 and is tied to the second ribbon 56, thus forming a secure tie to the swing chain 58.

The front panel 26 of swing chain cover 20 is made from material called furry fleece, it is one hundred percent polyester and is readily available at many fabric manufacturers in the U.S.A., it is found in many colors and textures and gives the swing chain cover 20 it's comfortable, kid friendly feeling when touched and held.

The middle panel 24 is made of one hundred percent polyester and is used for the inner batting of the swing chain cover 20, batting are usually used by quilters as a layer of insulation between the patchwork and the bottom layer of backing material.

The back panel 22 of the swing chain cover 20 is made of a material called crepe; it is a type of light, soft, thin cloth made from ninety percent polyester and ten percent spandex. I choose to use black crepe for the back panel 22 of the swing chain cover 20, because the back panel 22 goes against the swing chain 58 and can get dirty. In a preferred embodiment, the swing chain cover 20 is formed from several different materials including cloth. Cloth, i.e., a woven fabric available in many styles, patterns, textures, and colors so that a variety of different animal characters can be created and is hand washable material for the swing chain cover 20. In addition, the cloth material is comfortable and provides 3 layers of protection between the swing chain 58 and the child's hands.

Referring to FIGS. 6-9, FIG. 6 shows back panel 22, middle panel 24, and front panel 26 are layered right on top of each other according to how they are sewn together along the first longitudinal edge 28, the first latitudinal edge 38, and the second longitudinal edge 30, and thus forming seam 36 and becoming one piece that forms the cover unit of the swing chain cover 20. After the cover unit is sewn on three sides leaving the second latitudinal edge 40 open, it is then reversed i.e., turned inside out and thus displays the furry fleece front panel 26 now showing on the outside, the back panel 22 is now on the backside, and the middle panel 24 is in the middle, leaving the second latitudinal edge 40 open to attach the head panel 42 (referring to FIG. 7) to the body of the swing chain cover 20. FIG. 7 the head panel 42 has two panels which are sewn together on top of one another around the circular edge thus forming seam 66. The foot panel 54 has two panels which are sewn together on top of one another thus forming seam 68. The arm panel 52 has two panels which are sewn together on top of one another thus forming seam 70. The ear panel 50 has two panels which are sewn together on top of one another thus forming seam 72. The eye parts 44 are made of plastic and are snapped into the head panel 42 before it is sewn. The nose part 46 is made of plastic and is also snapped into the head panel 42 before it is sewn. The mouth panel 48 is sewn into the head panel 42 thus forming seam 74.

The head panel 42 is sewn closed along the second latitudinal edge 40 thus joining with seam 36. Head panel 42, arm panel 52, foot panel 54, and ear panel 50 are filled with one hundred percent polyester filler 64 (referring to FIG. 8) prior to being sewn onto the swing chain cover 20. The polyester filler is used to give the panels a stuffed look. FIG. 8 shows the 100% polyester filler/stuffing. FIG. 9 shows ribbon 56 having a first end 76 and a second end 78 with said ribbon 56 having a size of seven inches long by one inch wide.

Referring to FIG. 10 shows a back view of the opened swing chain cover 20 attached to a swing chain 58. One of the ribbons 56 second end 78 is passed through the hole of a chain's link and tied to the first end 76 securing the cover unit to the swing chain 58. The female snaps along the second longitudinal edge 30 and the male snaps along the first longitudinal edge 28 will meet as to pair up together and snap together as the cover unit is closed along both the first longitudinal edge 28 and the second longitudinal edge 30 thus enclosing the swing chain 58 within the swing chain cover 20 while in use. The swing chain cover 20 will be sold in pairs thus covering both swing chains 58 with the swing chain cover 20. The child would then sit on the swing seat 60 and hold onto a swing chain cover 20, as in a pair (2), one swing chain cover 20 per hand.

In summary, the present invention teaches of a swing chain cover for a swing chain that provides comfort, safety, and companionship to the child user and is easily attached to and easily removed from the swing chain for convenience.

Although the preferred embodiments of the invention have been illustrated and described in detail, it will be readily apparent to those skilled in the art that various modifications may be made therein without departing from the spirit of the invention or from the scope of the appended claims. For example, the swing chain cover can be adapted to include different types of materials and different characters, i.e. cat, duck, frog, cow etc.

| SWINGBUDDIES Swing Chain Cover Embodiments | |
|---|---|
| Ref. Numbers | Description |
| 20 | Swing Chain Cover |
| 22 | Back Panel (crepe material) |
| 24 | Middle Panel (100% polyester batting) |
| 26 | Front Panel (furry fleece) |
| 28 | First Longitudinal Edge |
| 30 | Second Longitudinal Edge |
| 32 | Female Nickel Plated Brass Snaps |
| 34 | Male Nickel Plated Brass Snaps |
| 36 | Seam |
| 38 | First Latitudinal Edge |
| 40 | Second Latitudinal Edge |
| 42 | Head Panel |
| 44 | Eye (plastic piece snap on) |
| 46 | Nose (plastic piece snap on) |

| SWINGBUDDIES Swing Chain Cover Embodiments | |
|---|---|
| Ref. Numbers | Description |
| 48 | Mouth (sewn onto head panel) |
| 50 | Ear Panel |
| 52 | Arm Panel |
| 54 | Foot Panel |
| 56 | Ribbon (7" piece) |
| 58 | Swing Chain |
| 60 | Swing Seat |
| 62 | Tri Bracket |
| 64 | 100% Polyester Stuffing |
| 66 | Seam (head panel) |
| 68 | Seam (leg panel) |
| 70 | Seam (arm panel) |
| 72 | Seam (ear panel) |
| 74 | Seam (mouth panel) |
| 76 | First End of 56 |
| 78 | Second End of 56 |

What I claim as my invention is:

1. A swing chain cover device comprising;
   a) a fabric panel that is approximately rectangular in shape;
   b) a circular character head attached to the fabric panel;
   c) a pair of tie ribbons attached to the back of the character head and used as the point of attachment to a swing's chain;
   d) fastening mechanisms attached to the inner layer of the fabric panel.

2. The device of claim 1 wherein the fabric panel has a front layer made of a soft furry material.

3. The device of claim 1 wherein the fabric panel has a middle layer made of a cushioning material.

4. The device of claim 1 wherein the fabric panel has a back layer made of a durable material.

5. The device of claim 1 wherein the fastening mechanisms consists of 6 nickel plated male snaps and 6 nickel plated female snaps.

6. The device of claim 5 wherein the fastening mechanisms are attached to the back layer on both sides along the back layer's latitudinal edge.

7. The device of claim 1 wherein the fabric panel further comprises of character hands located on the front layer and character feet located on the bottom of the fabric panel.

* * * * *